Feb. 3, 1959 R. TOWNSEND ET AL 2,872,665

INPUT/OUTPUT EQUIPMENT

Filed Jan. 24, 1957 3 Sheets-Sheet 1

*INVENTORS*
Ralph Townsend
Herbert F. Ayres

*BY* [signature]
*ATTORNEY*

INVENTORS
Ralph Townsend
Herbert F. Ayres
BY
Fred Jacob
ATTORNEY

Feb. 3, 1959 R. TOWNSEND ET AL 2,872,665
INPUT/OUTPUT EQUIPMENT
Filed Jan. 24, 1957 3 Sheets-Sheet 3

INVENTORS
Ralph Townsend
Herbert F. Ayres
BY
Fred Jacob
ATTORNEY

United States Patent Office
2,872,665
Patented Feb. 3, 1959

2,872,665

INPUT/OUTPUT EQUIPMENT

Ralph Townsend, Manchester, and Herbert F. Ayres, Hingham, Mass., assignors, by mesne assignments, to Laboratory for Electronics, Inc., Boston, Mass., a corporation of Delaware Application January 24, 1957, Serial No. 636,061
13 Claims. (Cl. 340—174)

The present invention relates in general to new and improved systems for the time sharing of binary digital data processing equipment.

In certain types of data processing systems the transfer of information into and out of storage occurs by address. More specifically, respective data input and output devices are allotted specific portions of the available storage space. Thus, if the storage space consists of a band of magnetic tracks on a magnetic drum, a given input device, e. g. a Flexowriter, will be permitted to write on a predetermined sector of the band only. Similarly, the same Flexowriter will read data out of the drum only from the aforementioned sector. If several Flexowriters are used, each one has its own sector or sectors assigned to it. It will be evident therefore, that the data transferred to or from the drum must be addressed to its proper sector thereon. Where a high speed temporary storage drum is used, the speed of drum operation is generally higher by several orders of magnitude than that of the fastest input or output device. As a result, the number of data characters which are transferred to or from the drum per drum revolution will depend on the speed of operation of the particular input or output device. It is important that the data character or characters of a given drum sector which are transferred during any given drum revolution immediately succeed the last character in that sector which was transferred during the preceding revolution. Since each sector contains a number of subdivisions or spaces, the address of a data character must contain not only information which specifies its allocated sector on the drum, but must additionally contain information concerning the number of the space within the sector to or from which it is to be transferred. Inasmuch as a space accommodates only a single data character, it will be convenient to refer to the latter by number, i. e. the number of the appropriate space to or from which the data character is to be transferred.

Heretofore, a counter has been provided with each device which writes into or reads out of the aforementioned band on the drum by character position. These counters store the position, i. e. the number in the sector, of the next character to be written on or read from the band. This character is inserted or read from the correct character position when coincidence is found between the output signal of the input/output device counter and that of a clock counter. The latter is permanently associated with the drum to count the number of characters within each sector. Thus, each device that delivers or receives information by character needs both a character counter and a coincidence detector. The amount of apparatus required is considerable, especially if a large number of input/output devices are used. A useful economy can be achieved if these counters and their associated coincidence detectors can be eliminated.

Accordingly, it is an object of this invention to provide simple and economical data transfer apparatus which requires less equipment than has heretofore been possible.

It is another object of this invention to provide data transfer apparatus which is time shared between a number of data input/output devices.

It is a further object of this invention to take advantage of the different speeds of operation of data storage equipment and associated data input/output devices by providing a system for the time sharing of common data transfer apparatus.

It is an additional object of this invention to provide a system for the time sharing of a single input/output counter and of a single coincidence detector among several input/output devices.

These and other objects of the invention together with further advantages thereof will become apparent from the following specification and drawings in which.

The principle of the system which forms the subject matter of the present invention is to store the number representing the data character which is next to be written on or read from a particular sector of a storage drum, in a shift register or the like. A pulse is derived as each sector of the drum appears, such sector pulses being used as shift pulses for the register. As each sector of the drum appears, the number of the character appropriate to it, i. e. the number of the character which is to be written or read next, is moved out of the register so that it may be compared with the output signal of the drum clock counter. Upon coincidence, a "write" or "read" signal is issued which writes into or reads out of the storage drum the data character or characters for the given sector that are to be transferred during the instant drum revolution. As mentioned above, the number of data characters so transferred per drum revolution depends upon the operating speed of the input or output device and is thus controlled. The number of the next character to be transferred to or from the drum on the following revolution pertaining to the aforementioned given sector, is derived from the clock counter itself. This occurs in the following manner: After the number $n$ has been moved out of the shift register, coincidence is obtained when the clock counter indicates $n$ at its output. The coincidence signal is delayed for a period of one bit time for each data character of the given sector which is transferred during one drum revolution. Thus, $k$ bit times later, the signal is used to open a gate which passes the number $n+k$ derived from the output of the counter, where $k$ is the number of data characters of the given sector transferred during said drum revolution. Alternatively, a conventional adding device may be used which will add the number $k$ to the number of the last data character that produced coincidence. The number $n+k$ is fed to the shift register where it is shifted one place by each arriving sector pulse. When the appropriate sector reappears on the drum, this number appears at the output of the shift register and is passed into storage to await coincidence with the output signal of the clock counter, as explained above.

Figure 1:
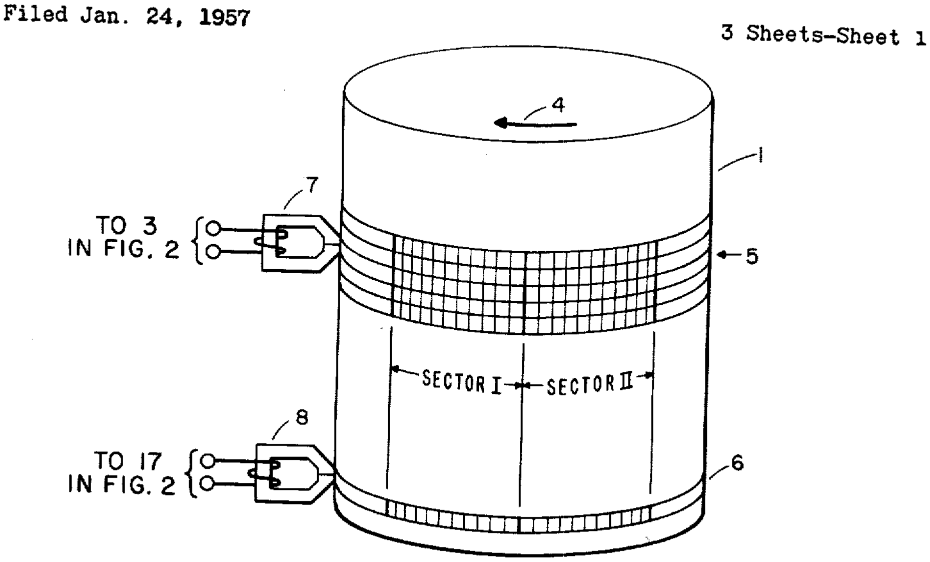
Fig. 1 illustrates a storage drum and the division of the storage space thereon.

With reference now to Fig. 1, a magnetic drum 1 is shown which contains a plurality of data bands 5, only one of which is illustrated. In the example of Fig. 1, band 5 consists of five data tracks and is further divided into a plurality of sectors around its circumference, sectors I and II being illustrated. Each sector is subdivided into $r$ spaces such that the portion of each magnetic track contained in such space is adapted to hold a single binary digit. In the example illustrated, each sector space which contains five binary digits holds a single data character.

The number of bits per data character depends on the binary code employed. Accordingly, the number of data tracks per band may vary with the code chosen. A magnetic read/write head 7 is illustrated, it being understood that there is a separate head for each band track. The direction of drum rotation is shown by vector 4. Since the sector spaces are numbered in a counterclockwise direction in each sector, they rotate under magnetic head 7 in ascending order. The sequence is repeated as each sector arrives under the magnetic head. A clock track 6 stores a pulse for each sector space. Magnetic head 8 is positioned to detect the clock track pulses which are counted in a manner explained hereafter. For the purpose of illustration only, Fig. 1 shows 11 spaces per sector. In a preferred embodiment each sector consists of 75 spaces and hence, it stores 75 data characters.

Figure 2:
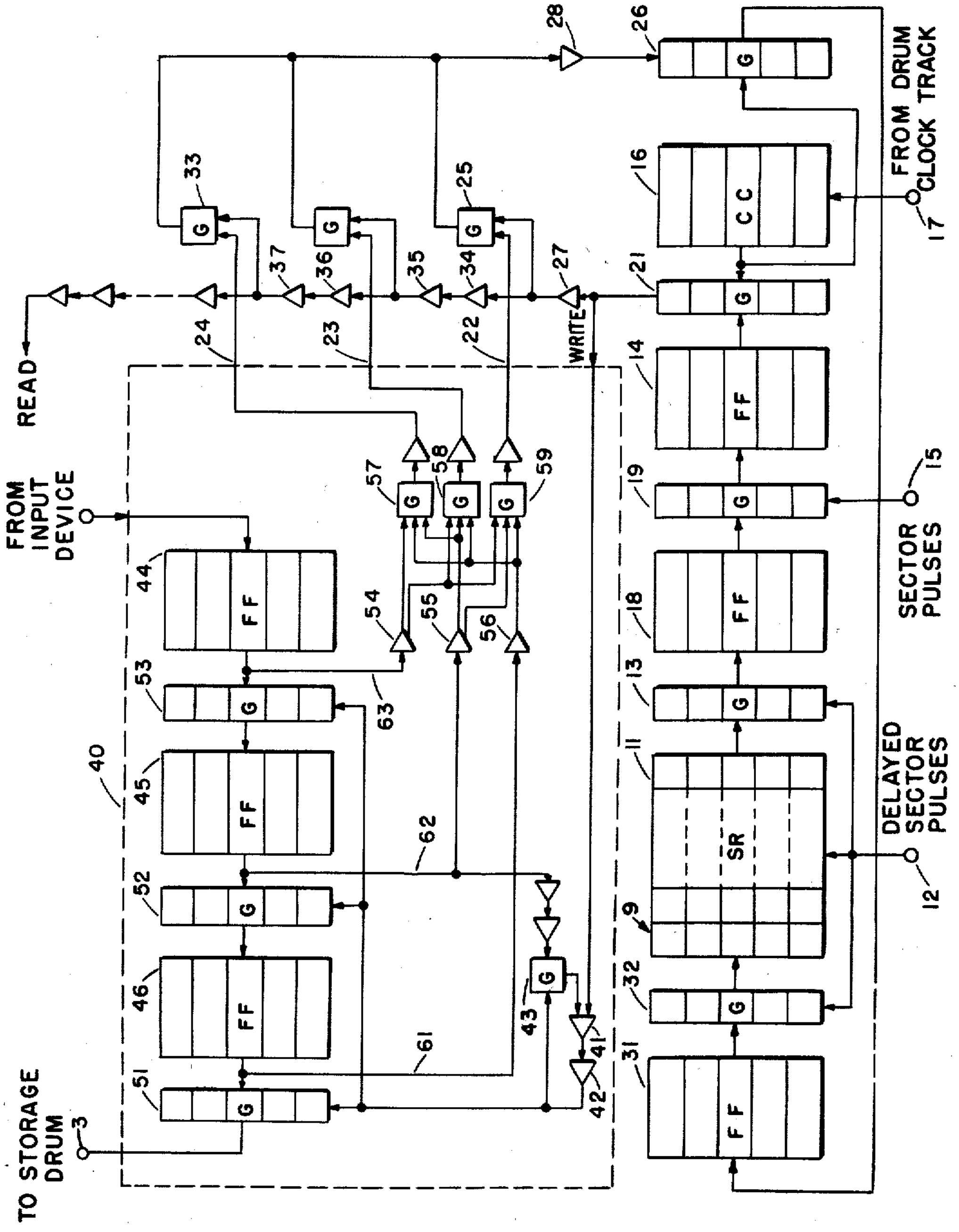
Fig. 2 illustrates one embodiment of the invention.

Fig. 2 illustrates the system which comprises the present invention. A conventional shift register 11 is shown which contains one data character for each sector of the storage drum that is in use, the broken lines indicating that the number of sectors which can be handled by the system may be any desired amount. The respective vertical columns 9 of shift register 11 are indicative of the numbers of individual data characters which are serially arranged in the register. Each of these numbers represents the first data character of a separate drum sector in Fig. 1 which is to be transferred to its appropriate space upon that sector's appearance under head 7. The horizontal divisions of each vertical column again illustrate in schematic form the number of binary digits or bits which are used to represent a data character. It will be understood that in actual practice each bit has its own signal path, although these signal paths are collectively represented in Fig. 2 by a single line connecting successive units of apparatus. Shift register 11, which is labeled SR in the drawings is connected to a terminal 12 which has delayed sector pulses applied thereto. The appearance in read/write posititon of each new sector on the drum coincides with a sector pulse which is obtained in a manner explained hereafter. This sector pulse is delayed prior to being applied to terminal 12. Each application of a delayed sector pulse to the shift register shifts each number contained therein by one place. The number at the output end is shifted out of the register and room is made for a new number which is inserted at the input. The output signal of the shift register is fed to a set of gates 13 which is similarly pulsed with delayed sector pulses and, like all other gates hereafter, is labeled G in the drawings. As the application of a delayed sector pulse shifts out the last number contained in the shift register while simultaneously opening gate 13, the shifted-out number is placed into storage in a set of flip-flop circuits 18, the latter being labeled FF, like all other flip-flop circuits hereafter. Each flip-flop may consist of a conventional circuit comprising two magnetic amplifiers connected in series and a recirculation gate connecting the output of the second amplifier to the input of the first one. Respective bits which are represented by a pulse or the absence thereof, circulate around individual flip-flop circuits and become available at the output thereof at bit time intervals. The output of flip-flop 18 is connected to a set of gates 19, the output of which, in turn, is connected to the input of another set of flip-flop circuits 14. Gate 19 is connected to terminal 15 which has sector pulses directly applied thereto. The loading of flip-flop 18 with a number upon the appearance of a delayed sector pulse occurs within the duration of the sector whose initial appearance produced the original sector pulse from which the delayed sector pulse is derived. Upon the appearance of the next sector, another sector pulse is produced which opens gate 19 and loads the aforesaid number into storage in flip-flop 14. Accordingly, the number is immediately available for comparison at the output of flip-flop 14 from the time when the first character of the new sector appears. A clock counter 16, labeled CC in the drawings, is connected to a terminal 17 which receives clock track pulse signals from magnetic head 8 in Fig. 1. As a result, the counter at any moment indicates the number of the data character which is about to move into read/write position in a particular drum sector, as respective ones of said drum sectors rotate under head 7. The clock counter may take the form of a conventional ring counter comprising a flip-flop circuit for each bit of the kind described above. A second gate connects the output of each flip-flop circuit to the input of the subsequent flip-flop circuit in the clockcounter. Whenever a clock pulse is received from the drum clock track via terminal 17, the recirculation gate of each flip-flop circuit closes while each of said second gates opens. Accordingly, if a bit is contained in one of the counter flip-flop circuits, it is shifted out to the subsequent flip-flop circuit by the application of the pulse. The occurrence of each clock pulse so applied increases the number indicated at the counter output by one. At the end of each sector, i. e. upon counting the $r$th pulse, the counter is reset and the counting sequence begins anew. At this time, a pulse is derived from the clock counter which is the aforementioned sector pulse applied to terminal 15. When the number which is in storage in flip-flop circuit 14 is equal to the number indicated at the output of clock counter 16, coincidence is obtained and gate 21 opens to pass a coincidence read/write pulse. If only one character is to be written, i. e. if $k=1$, gate 25 is opened by a pulse applied to line 22. In this case the coincidence signal is applied to a set of gates 26 after being delayed one bit period by amplifiers 27 and 28. The output of the clock counter is further connected to gate 26. At the instant gate 26 opens in response to the delayed coincidence signal, the output signal of clock counter 16 indicates the number $n+1$, where $n$ is the number of the data character which previously produced coincidence. Accordingly, the number $n+1$, passes gate 26 and is placed into storage in flip-flop 31, to appear at the output of the latter at bit time intervals. The arrival of the next delayed sector pulse opens gate 32 to feed the number $n+1$ to the input of the shift register. If $p$ is the number of sectors which are being written upon (or read out) during one drum revolution, the number $n+1$ will appear at the output of shift register 11 $p$ sector pulses later in order to produce another coincidence read/write signal when data character $n+1$ of the same sector is about to move under magnetic head 7.

The circulation path linking the output of gate 26 to the input of flip-flop circuit 31 is shown to contain a broken section to indicate a certain amount of unavoidable delay in the equipment. It is important that the signal applied to flip-flop circuit 31 arrives prior to the occurrence of the delayed sector pulse of the next sector. In that case, the number will be available for loading into shift register 11 at the time the aforesaid delayed sector pulse of the next sector opens gate 32.

As previously explained, depending on the speed of operation of the input or output device, it is sometimes possible to read or write more than a single character per drum revolution. Fig. 2 illustrates apparatus for transferring up to three data characters per drum revolution by the application of signals to signal paths 22, 23 or 24 respectively. The embodiment illustrated in the drawings may be expanded upon and is not intended to be limiting. Where the operating speed of the input/output equipment assigned to a particular sector permits, as many as $k$ characters may be transferred per drum revolution, the upper limit of $k$ being determined by the number $r$ of available sector spaces. If three data characters are to be written in a single drum revolution, gate 33 is opened by means of a pulse applied via signal path 24. The coincidence output signal of gate 21, which initiates the writing of three data characters, is applied to gate 26 via gate 33 but is delayed three bit periods by amplifiers 27, 34, 35, 36, 37 and 28 respectively, each amplifier being responsible for a delay of one-half bit time. Three bit periods after coincidence has taken place, counter 16 has counted up to the number $n+3$ and gate 26 opens. This number is then transferred by way of gate 26 to the input of flip-flop 31 for further transfer to the input of the shift register.

Unit 40 illustrates one embodiment of a circuit responsible for the transfer of one or more data characters between the input device and the storage drum. As shown in Fig. 2, it consists of three sets of flip-flop circuits 44, 45 and 46, each of which is followed by a set of gates 53, 52 and 51 respectively. The outputs of flip-flop circuits 44, 45 and 46 which connect to gates 53, 52 and 51 respectively, follow the schematic representation adopted hereinbefore by representing five respective bit paths. Each of outputs 61, 62 and 63, however, indicates a single signal path which receives its input from the aforesaid five signal paths buffered together. Since the presence of a data character, derived from an input device, in one of the flip-flop circuits 44, 45 or 46 produces the presence of a bit in at least one of the five bit paths of this flip-flop circuit, a signal will appear on the corresponding signal path 61, 62 or 63. The writing process is started by the "write" coincidence signal obtained from gate 21 which is transmitted to a flip-flop circuit consisting of amplifiers 41, 42 and gate 43. The flip-flop output pulses open gates 53, 52 and 51 and permit the stored characters to proceed to terminal 3 for further transfer to head 7 of Fig. 1. Pulses are obtained from this flip-flop circuit as long as an output signal is received from line 62. These pulses indicate the presence of a data character in flip-flop 45. When the last stored character is shifted from flip-flop 45 to flip-flop 46, a binary 0 output signal appears on signal path 62. One bit period later, gate 43 opens which terminates the signals so applied to gates 51, 52 and 53. Signal paths 63, 62 and 61 are connected to amplifiers 54, 55 and 56 respectively. The direct and the logically inverted outputs of the latter amplifiers (inverted outputs being shown by a signal path issuing from one of the sides of the triangle), are so connected to gates 59, 58 and 57 that the output signals of the latter gates, as they appear on signal paths 22, 23 and 24 respectively, indicate whether one, two or three characters are to be written. Apparatus similar to unit 40 is used if more than one data character per drum revolution is to be read from the drum, due care being taken to coordinate the timing of all signals involved.

Figure 3:
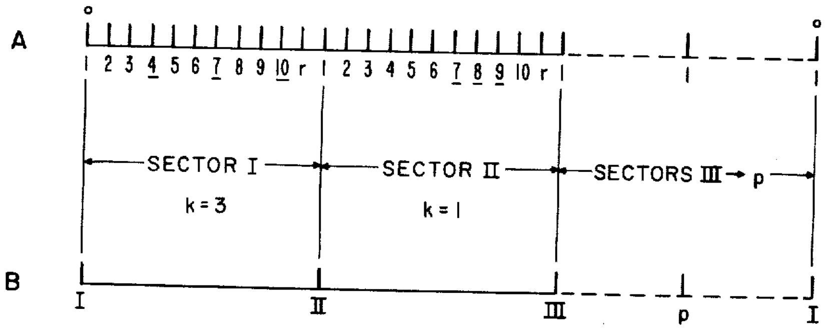
Fig. 3 illustrates the relationship of the pulses employed.

Fig. 3A represents the drum clock track, where the circle above pulse I at the beginning and end of the track indicates that the latter closes on itself. For purposes of illustration only, each sector is shown to contain eleven spaces and hence $r=11$. It will be seen that the counting sequence repeats in each sector, the underlined numbers indicating those space numbers which are loaded into shift register 11. Fig. 3B illustrates the relationship of the sector pulses to the corresponding clock pulses. Each sector pulse occurs coincidentally with the first clock pulse of one of the aforesaid $p$ drum sectors and thus initiates the latter. It will be noted that the last sector pulse illustrated is again sector pulse I and hence, another drum revolution is initiated. Referring again to the example above wherein three data characters per drum revolution are transferred to sector I, i. e. $k=3$, it will be assumed that the third space of sector I was the last one to be filled during the previous drum revolution. Accordingly, by the operation described before, the number $n$ of the sector space which is to receive a data character next, i. e. the number 4, has been moved toward the output of shift register 11. Upon the initiation of sector I by the occurrence of sector pulse I, the number 4 appears at the output of flip-flop 14 of Fig. 2. When the same number appears at the output of clock counter 16 to produce coincidence, gate 21 opens and a "write" pulse is issued. This "write" pulse opens gate 51 and the data character which is in flip-flop 46 is transferred to magnetic head 7 at the instant when space 4 of sector I moves into "write" position. The data characters which are in flip-flops 45 and 44 respectively during the foregoing process move toward flip-flop 46 at bit time intervals and are transferred to head 7 by the same path. Accordingly they are written into spaces 5 and 6 respectively of sector I immediately following the writing into space 4 thereof. Three bit times after the issuance of the "write" signal, when the clock counter indicates the number 7 at its output, gate 26 opens and this number is fed to flip-flop 31 for subsequent transfer to shift register 11.

The arrival of sector II immediately after sector I is indicated by sector pulse II. Assuming the sixth space of this sector to be the last one filled during the previous drum revolution and $k=1$, the number 7, which previously followed the number 4 in the shift register, now appears at the output of flip-flop 14. As soon as the clock counter counts up to seven, a "write" signal is issued as explained before and a data character from an input device assigned to sector II is transferred to head 7 of Fig. 1 at the moment space 7 of sector II moves into "write" position. One bit time after the issuance of the write signal, the number 8 is transferred from the output of the clock counter whence it subsequently reaches flip-flop 31 and is thereafter loaded into shift register 11.

Sectors III to $p$ each appear under read/write head 7 during the same drum revolution, each being initiated by its corresponding sector pulse. Data is transferred to or from each sector by the procedure outlined above. During the subsequent drum revolution, sector I is again initiated by sector pulse I. By the process outlined above, the number 7 is now transferred out of the shift register and a "write" signal is issued when the corresponding number appears at the output of the clock counter. Spaces 7, 8 and 9 of sector I are filled and the number 10 is stored in the shift register, as before. In sector II, space 8 is filled while the number 9 is placed into storage in the shift register.

It will be understood that in the arrangement described above a delay occurs between the time a number appears at the output of the clock counter and the time the corresponding sector space moves into data transfer position. Accordingly, the clock counter must be arranged to advance its count by the required number of bit times in order to provide proper timing of the system.

Figure 4:
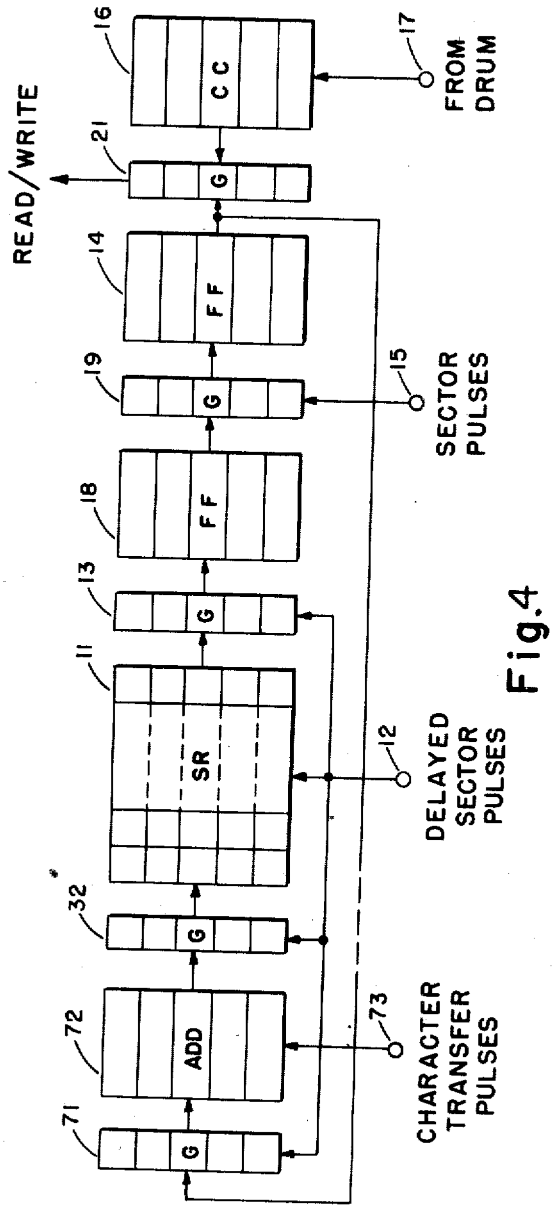
Fig. 4 illustrates a modification of the apparatus of Fig. 2.

Fig. 4 illustrates a modification of the apparatus of Fig. 2, corresponding reference symbols having been carried over. In this embodiment, the output signal of flip-flop circuits 14 is fed to a set of gates 71 which is pulsed by delayed sector pulses from terminal 12. The output of gate 71 is connected to an adder 72 designated Add, which is pulsed from a source 73. In the instant embodiment, the adder may take the form of a counter which adds $k$ for every pulse received from source 73, where $k$ again represents the number of data characters which are transferred from the same sector during a given drum revolution. This addition occurs in a fraction of a bit time, thereby enabling 71 and gates 32 to be operated by the same pulse. It will be understood that the time delay between the output of flip-flop 14 and the input of gate 71, as indicated by the broken section of the connecting line, must be adjusted to fit the requirements of the circuit of Fig. 4. Additionally, the data character transfer pulses applied from terminal 73 must be timed accordingly. Pulse source 73 provides a pulse every time a data character is transferred to or from a drum. Thus, if $k$ characters are transferred in the given sector per drum revolution, the number $k$ will to be added to the number $n$ received from the output of flip-fiop circuit 14. The number $n+k$ is then fed to the shift register.

It will be seen that the arrangement described in connection with Fig. 4 substitutes an adding scheme for the arrangement of Fig. 2 wherein the drum clock counter counts up to the number $n+k$ before the latter number is ultimately fed to the input of the shift register. The adder described above is, of course, susceptible of a great number of variations, adder circuits being well known in the art.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. Apparatus for transferring data between a plurality of data utilization devices and a data storage medium having sector divisions, said data consisting of individual data characters, respective sectors of said storage medium being allocated to respective ones of said plurality of data utilization devices, each of said sectors having a number of subdivisions, each subdivision being adapted to hold a single data character, respective sectors being in data transfer position during recurring time periods, a counter associated with said storage medium for counting the number of subdivisions in each of said respective sectors, means responsive to the transfer of data in each of said respective sectors to derive the number of the next sector subdivision relative to which data transfer will occur during the next recurring time period, means for storing respective ones of said last recited numbers pending the recurrence of the appropriate sector time period, means for comparing successive numbers appearing at the output of said storage means with the numbers indicated at the output of said counter, and means responsive to a predetermined relationship of said compared numbers to transfer data characters between respective ones of said data utilization devices and the appropriate subdivisions of their respective allocated sectors.

2. Apparatus for transferring data from a plurality of input devices to a data storage medium having sector divisions, said data consisting of individual data characters, respective sectors of said storage medium being allocated to respective ones of said plurality of input devices and receiving at least one data character from the latter during recurring time periods, each of said sectors having a number of subdivisions, successive subdivisions of respective sectors receiving data characters during discrete time intervals of said time periods, a counter associated with said storage medium for counting the number of subdivisions in each of said respective sectors, means responsive to the transfer of data to each of said respective sectors during each time period to derive the number of the next sector subdivision which is to receive a data character during the following recurrence of said time period, said numbers being derived from said counter, means for storing each of said numbers until the appropriate sector is again ready to receive data, means for comparing successive stored numbers appearing at the output of said storage means with the numbers indicated at the output of said counter, and means responsive to a predetermined relationship of said compared numbers to transfer data characters from respective ones of said input devices to the appropriate subdivisions of their respective allocated sectors.

3. Apparatus for transferring data from a plurality of input devices to a data storage medium having sector divisions, said data consisting of individual data characters, respective sectors of said storage medium being allocated to respective ones of said plurality of input devices, said sectors receiving data characters during periodically recurring time periods, each of said sectors having a number of subdivisions, successive subdivisions of respective sectors receiving data characters during discrete time intervals of said time periods, a counter associated with said storage medium for counting the number of subdivisions in each of said respective sectors, means responsive to the total number of subdivisions filled with data characters during each of said time periods to derive the number of the next subdivision which is to receive a data character during the following recurrence of said time period, said latter numbers being derived from said counter, means for storing each of said latter numbers pending the recurrence of the appropriate time period, means for comparing successive stored numbers appearing at the output of said storage means with the numbers indicated at the output of said counter, and means responsive to a predetermined relationship of said compared numbers to transfer data characters from respective ones of said input devices to the appropriate subdivisions of their respective allocated sectors.

4. Apparatus for transferring data from a plurality of input devices to a data storage medium having sector divisions, said data consisting of individual data characters, respective sectors of said storage medium being allocated to respective ones of said plurality of input devices, said sectors receiving data characters during periodically recurring time periods, each of said sectors having a number of subdisivions, successive subdivisions of respective sectors receiving data characters during discrete time intervals of said time periods, a counter associated with said storage medium for counting the number of subdivisions in each of said respective sectors, means for obtaining from said counter the number of the first subdivision receiving a data character during each of said time periods, means for adding to said number the total number of subdivisions filled during the same time period, said addition yielding the number of the first subdivision which is to receive a data character during the following recurrence of said time period, means for storing the last recited number for each of said sectors pending the recurrence of the appropriate time period, means for comparing successive stored numbers appearing at the output of said storage means with the numbers indicated at the output of said counter, and means responsive to a predetermined relationship of said compared numbers to transfer data characters from respective ones of said input devices to the appropriate subdivisions of their respective allocated sectors.

5. Apparatus for transferring data from a sector-divided data storage medium to a plurality of output devices, said data consisting of individual data characters, respective ones of said plurality of output devices having respective sectors of said storage medium allocated thereto and receiving at least one data character from the latter during recurring time periods, each of said sectors having a number of subdivisions, data characters being transferred out from successive subdivisions of respective sectors during discrete time intervals of said time periods, a counter associated with said storage medium for counting the number of subdivisions in each of said respective sectors, means responsive to the transfer of data from each of said respective sectors to derive the number of the next sector subdivision from which a data character is to be transferred out, said numbers being derived from said counter, means for storing each of said numbers until the appropriate sector is again ready to transfer data out, means for comparing successive stored numbers appearing at the output of said storage means with the numbers indicated at the output of said counter, and means responsive to a predetermined relationship of said compared numbers to transfer data characters to respective ones of said output devices from the appropriate subdivisions of their respective allocated sectors.

6. Apparatus for transferring data from a sector-divided data storage medium to a plurality of output devices, said data consisting of individual data characters, respective ones of said plurality of output devices having respective sectors of said storage medium allocated thereto and receiving data characters from the latter during periodically recurring time periods, each of said sectors having a number of subdivisions, data characters being transferred out from successive subdivisions of respective sectors during discrete time intervals of said time periods, a counter associated with said storage medium for counting the number of subdivisions in each of said respective sectors, means responsive to the total number of subdivisions from which data characters are transferred out during each of said time periods to derive the number of the next sector subdivision from which a data character is to be transferred out during the following recurrence of said time period, said latter numbers being derived from said counter, means for storing each of said numbers pending the recurrence of the appropriate time period, means for comparing successive stored numbers appearing at the output of said storage means with the numbers indicated at the output of said counter, and means responsive to a predetermined relationship of said compared numbers to transfer data characters to respective ones of said output devices from the appropriate subdivisions of their respective allocated sectors.

7. Apparatus for transferring data from a sector-divided data storage medium to a plurality of output devices, said data consisting of individual data characters, respective ones of said plurality of output devices having respective sectors of said storage medium allocated thereto and receiving data characters from the latter during periodically recurring time periods, each of said sectors having a number of subdivisions, data characters being transferred out from successive sector subdivisions during discrete time intervals of said time periods, a counter associated with said storage medium for counting the number of subdivisions in each of said respective sectors, means for obtaining from said counter the number of the first subdivision from which a data character is transferred out during each of said time periods, means for adding to said number the total number of subdivisions from which data characters are transferred out during each of said time periods, said addition yielding the number of the first subdivision from which a data character is to be transferred out during the following recurrence of said time period, means for storing the last recited number for each of said sectors pending the recurrence of the appropriate time period, means for comparing successive stored numbers appearing at the output of said storage means with the numbers indicated at the output of said counter, and means responsive to a predetermined relationship of said compared numbers to transfer data characters to respective ones of said output devices from the appropriate subdivisions of their respective allocated sectors.

8. Apparatus for transferring data between a plurality of data utilization devices and a data storage medium having sector divisions, said data consisting of individual data characters, respective sectors of said storage medium being allocated to respective ones of said plurality of data utilization devices, each of said sectors being divided into a plurality of numbered spaces each adapted to hold a single data character, respective sectors transferring data during periodically recurring time periods, successive spaces of respective sectors moving into data transfer position during said time periods, at least one data character being transferred during each of said time periods, data transfer in each of said sectors proceeding by successively numbered spaces, a counter associated with said storage medium for counting the number of spaces in respective ones of said sectors, the counter output signal indicating the number of the space moving into data transfer position, a set of gates connected to the output of said counter, means for comparing the output signal of said counter with a signal representative of the number of the first sector space relative to which a data character is to be transferred during the instant time period, means responsive to coincidence of said compared signals to produce a pulse for carrying out the transfer of said data character, means for applying said coincidence pulse to said set of gates to open the latter and pass the signal then appearing at the counter output, means dependent on the total number of data characters transferred during said instant time period to delay said coincidence pulse prior to its application to said set of gates, the output signal of said set of gates derived from said counter being representative of the number of the first space in said sector relative to which a data character is to be transferred during the following recurrence of said time period, means for storing respective output signals so derived for each of said sectors pending the following recurrence of the appropriate time period, respective ones of said signals appearing at the output of said storage means during successive time periods for comparison with the counter output signal.

9. The apparatus of claim 8 wherein said storage means comprises a shift register, said shift register containing the numbers represented by each of said gate output signals in binary digital form, and means dependent upon the occurrence of successive time periods for moving said numbers in steps from the input to the output of said shift register.

10. Apparatus for transferring data between a plurality of data utilization devices and a data storage medium having sector divisions, said data consisting of individual data characters encoded in binary digital code, respective sectors of said storage medium being allocated to respective ones of said plurality of data utilization devices, each of said sectors being divided into a plurality of numbered spaces each adapted to hold a single data character, respective sectors transferring data during periodically recurring time periods, successive spaces of respective sectors moving into data transfer position during said time periods, at least one data character being transferred during each of said time periods, data transfer in each of said sectors proceeding by successively numbered spaces, a counter associated with said storage medium for counting the number of spaces in respective ones of said sectors, the counter output signal indicating the number of the space moving into data transfer position, means for comparing the output signal of said counter with a signal representative of the number of the first sector space relative to which a data character is to be transferred during the instant time period, means responsive to coincidence of said compared signals to produce a pulse for carrying out the transfer of said data character, means for adding the number indicated by the counter output signal during coincidence to the total number of data characters transferred during said instant time period, said addition producing an output signal representative of the number of the first space in said sector relative to which a data character is to be transferred during the following recurrence of said time period, means for storing respective output signals so produced for each of said sectors pending the arrival of the appropriate time period, respective ones of said signals appearing at the output of said storage means during successive time periods for comparison with the counter output signal.

11. The apparatus of claim 10 wherein said storage means comprises a shift register, said shift register containing the numbers represented by each of said gate output signals in binary digital form, and means dependent upon the occurrence of successive time periods for moving said numbers in steps from the input to the output of said shift register.

12. Apparatus for writing data derived from a plurality of input devices into a revolving data storage medium having sector divisions, respective sectors of said medium being allocated to respective ones of said plurality of input devices, each of said sectors being divided into a plurality of numbered spaces each adapted to hold a single data character, said data characters being written into respective sectors during recurring time periods determined by the speed of revolution of said storage medium, successive spaces of a sector moving into data receiving position during discrete time intervals of said time periods, the spaces of each of said sectors being filled in consecutive numerical order with said data characters, at least one data character being written into each of said sectors during every revolution of said storage medium, a counter associated with said storage medium for counting the number of spaces of respective sectors during the appropriate recurring time periods, the counter output signal at any given instant indicating the number within the appropriate sector of the space moving into data receiving position, a set of gates connected to the output of said counter, means for comparing the output signal of said counter with a signal representative of the number of the first sector space which is to be filled with a data character during the instant time period, means responsive to coincidence of said compared signals to produce a pulse for writing said data character into said first sector space, means for applying said coincidence pulse to said set of gates to open the latter and pass the signal then appearing at the counter output, means for delaying said coincidence pulse prior to its application to said set of gates by a number of time intervals, said last recited number being equal to the total number of data characters received during said instant time period, the output signal of said set of gates which is derived from said counter being representative of the number of the first space in said sector which is to be filled with a data character during the recurring time period in the next revolution, a shift register for simultaneously storing in binary digital form the numbers represented by respective output signals so derived, said shift register being pulsed whenever respective sectors of said storage medium move into data receiving position, the latter pulses, applied during one complete revolution of said data storage medium, moving each number stepwise from the input to the output of said shift register, each signal representative of the number appearing at the output of said shift register being compared with the counter output signal.

13. Apparatus for reading data out of a sector-divided, revolving data storage medium to a plurality of output devices, respective sectors of said medium being allocated to respective ones of said plurality of output devices, each of said sectors being divided into a plurality of numbered spaces each adapted to hold a single data character, said data characters being read out of respective sectors during recurring time periods determined by the speed of revolution of said storage medium, successive spaces moving into data readout position during discrete time intervals of said time periods, the spaces of each of said sectors being read out in consecutive numerical order, at least one data character being read out from each of said sectors during every revolution of said storage medium, a counter associated with said storage medium for counting the number of spaces of respective sectors during the appropriate recurring time periods, the counter output signal at any given instant indicating the number within the appropriate sector of the space moving into data readout position, a set of gates connected to the output of said counter, means for comparing the output signal of said counter with a single representative of the number of the first sector space which is to be read out during the instant time period, means responsive to coincidence of said compared signals to produce a pulse for reading said data character out of said first sector space, means for applying said coincidence pulse to said set of gates to open the latter and pass the signal then appearing at the counter output, means for delaying said coincidence pulse prior to its application to said set of gates by a number of time intervals, said last recited number being equal to the total number of data characters read out during said instant time period, the output signal of said set of gates which is derived from said counter being representative of the number of the first space in said sector which is to be read out during the recurring time period in the next revolution, a shift register for simultaneously storing in binary digital form the numbers represented by respective output signals so derived, said shift register being pulsed whenever respective sectors of said storage medium move into data readout position, the latter pulses, applied during one complete revolution of said data storage medium, moving each number stepwise from the input to the output of said shift register, each signal representative of the number appearing at the output of said shift register being compared with the counter output signal.

No references cited.